(12) United States Patent
Seo et al.

(10) Patent No.: US 9,696,720 B2
(45) Date of Patent: Jul. 4, 2017

(54) APPARATUS AND METHOD FOR CONTROLLING AUTONOMOUS NAVIGATION

(71) Applicant: HYUNDAI MOTOR COMPANY, Seoul (KR)

(72) Inventors: Min Wook Seo, Suwon-si (KR); Jun Soo Kim, Seoul (KR); Gil Won Seo, Hwaseong-si (KR); Sung Yun Kim, Seoul (KR); Bong Chul Ko, Hwaseong-si (KR); Joo Woong Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/944,050

(22) Filed: Nov. 17, 2015

(65) Prior Publication Data

US 2017/0060133 A1    Mar. 2, 2017

(30) Foreign Application Priority Data

Aug. 27, 2015 (KR) .......................... 10-2015-0121264

(51) Int. Cl.
*G01C 22/00* (2006.01)
*G05D 1/00* (2006.01)
*G05D 1/02* (2006.01)
*B62D 15/02* (2006.01)
*B60W 30/00* (2006.01)
*G08G 1/00* (2006.01)

(52) U.S. Cl.
CPC ........... *G05D 1/0212* (2013.01); *B60W 30/00* (2013.01); *B62D 15/0285* (2013.01); *G05D 1/0088* (2013.01); *G05D 1/0274* (2013.01); *G08G 1/00* (2013.01); *G05D 2201/0213* (2013.01)

(58) Field of Classification Search
CPC  B60W 30/06; B62D 15/0285; G06K 9/00812
USPC .......................................................... 701/25
See application file for complete search history.

(56) References Cited

U.S. PATENT DOCUMENTS 8,346,436 B2    1/2013  Yokoyama et al.
8,497,782 B2 *  7/2013  Barth ................. B62D 15/0285
                                                   180/204

(Continued)

FOREIGN PATENT DOCUMENTS

JP    2009-175962 A    8/2009
JP    2015-064747 A    4/2015

(Continued)

OTHER PUBLICATIONS

Korean Office Action dated Apr. 11, 2016, issued in Korean Application No. 10-2015-0121264.

*Primary Examiner* — Harry Oh
(74) *Attorney, Agent, or Firm* — McDermott Will & Emery LLP

(57) ABSTRACT

An apparatus for controlling autonomous navigation includes: a map data reception unit configured to receive parking lot map data indicating that a plurality of virtual lanes are located in a driving road in a parking lot and a grid point is located in each virtual lane by a certain interval from a parking server; and a controller configured to control driving of an autonomous vehicle based on a weight of each grid point included in the parking lot map data.

12 Claims, 11 Drawing Sheets

(56) References Cited

U.S. PATENT DOCUMENTS

| | | | | |
|---|---|---|---|---|
| 8,816,880 | B1* | 8/2014 | Foster | G08G 1/144 340/932.2 |
| 2012/0188100 | A1* | 7/2012 | Min | G08G 1/143 340/932.2 |
| 2014/0207325 | A1* | 7/2014 | Mudalige | B62D 15/025 701/26 |
| 2015/0046078 | A1* | 2/2015 | Biess | G08G 1/163 701/301 |
| 2015/0100193 | A1 | 4/2015 | Inagaki et al. | |

FOREIGN PATENT DOCUMENTS

| | | |
|---|---|---|
| JP | 2015-074253 A | 4/2015 |
| JP | 2015-083430 A | 4/2015 |
| KR | 10-1094153 B1 | 12/2011 |
| KR | 10-1382982 B1 | 4/2014 |
| KR | 10-1526606 B1 | 6/2015 |
| WO | 2006/064544 A1 | 6/2006 |

\* cited by examiner

APPARATUS AND METHOD FOR CONTROLLING AUTONOMOUS NAVIGATION

CROSS-REFERENCE TO RELATED APPLICATION

This application claims the benefit of priority to Korean Patent Application No. 10-2015-0121264, filed on Aug. 27, 2015 in the Korean Intellectual Property Office, the disclosure of which is incorporated herein in its entirety by reference.

TECHNICAL FIELD

The present disclosure relates to an apparatus and a method for controlling an autonomous navigation, and more particularly, to a technology for controlling driving of an autonomous vehicle in a parking lot, on the basis of parking lot map data indicating that a plurality of virtual lanes are located in a driving road in the parking lot and grid points are located in each virtual lane by a certain interval.

BACKGROUND

An unmanned vehicle requires technologies of various fields in order to achieve a given task in various environments. However, the most basic technology is an autonomous navigation technology that enables a vehicle to automatically drive to a given destination through a safe and rapid optimal path.

In recent years, an autonomous parking of the autonomous vehicle using the above autonomous navigation technology has been spotlighted.

According to the existing autonomous parking technology, the autonomous vehicle enters a parking lot to communicate with a parking server to receive a parking path, and moves to a designated parking slot based on the received parking path to perform parking.

Generally, since the parking lot in the building has a limited area, a driving road is narrow and it is regulated in such a manner that the navigation should be performed only in a single direction.

For example, when a vehicle running a center of the narrow driving road should turn to the left, it may happen that the vehicle is not able to turn to the left at one time.

In order to solve this problem, a technology for performing a left turn after calculating a rotation track before turning to the left has been developed. However, the above technology should perform calculation having high complexity in order to calculate the rotation track. Further, to this end, a calculator having high performance should be provided in the vehicle.

SUMMARY

In the present disclosure, a virtual lane represents a virtual reference lane when an autonomous vehicle is driven. The autonomous vehicle tracks the virtual reference lane in the driving road. The autonomous vehicle is driven along the virtual reference lane.

Further, the driving in the parking lot according to the present disclosure includes a driving from a parking lot entrance to a parking slot, a driving from the parking slot to a parking lot exit, a driving when a pedestrian is detected in a driving road in the parking lot, and a driving when a reverse driving vehicle is detected in a driving road in the parking lot. In this case, the reverse vehicle represents a vehicle running in a direction opposite to a navigation direction of a driver's vehicle. In general, since the parking lot in a building has a limited area, a driving road in the parking lot is one-way street. Accordingly, the present disclosure performs a control of autonomous navigation optimized for the parking lot.

The present disclosure has been made in view of the above problems, and provides an apparatus and a method for controlling an autonomous navigation capable of efficiently moving an autonomous vehicle to a desired location by controlling driving of an autonomous vehicle in a parking lot, on the basis of parking lot map data indicating that a plurality of virtual lanes are located in a driving road in the parking lot and grid points are located in each virtual lane by a certain interval.

In accordance with an aspect of the present disclosure, an apparatus for controlling autonomous navigation includes: a map data reception unit configured to receive parking lot map data indicating that a plurality of virtual lanes are located in a driving road in a parking lot and grid points are located in each virtual lane by a certain interval from a parking server; and a controller configured to control driving of an autonomous vehicle based on a weight of each grid point included in the parking lot map data.

In accordance with another aspect of the present disclosure, a method for controlling autonomous navigation includes: receiving parking lot map data indicating that a plurality of virtual lanes are located in a driving road in a parking lot and grid points are located in each virtual lane by a certain interval from a parking server, by a map data reception unit; and controlling driving of an autonomous vehicle based on a weight of each grid point included in the parking lot map data, by a controller.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
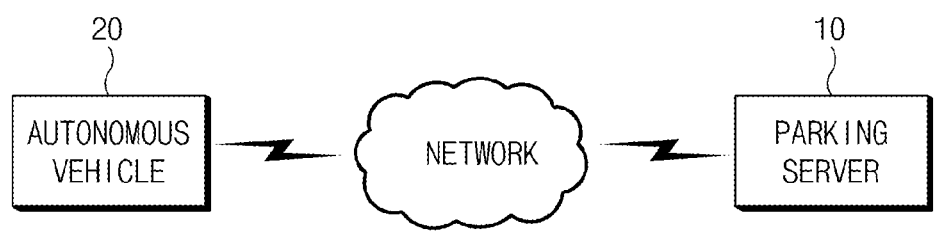
FIG. 1 is a diagram illustrating a configuration of an autonomous navigation system in a parking lot according to an embodiment of the present disclosure.

FIG. 1 is a block diagram illustrating a configuration of an autonomous navigation system in a parking lot according to an embodiment of the present disclosure.

As shown in FIG. 1, the autonomous navigation system in a parking lot according to an embodiment of the present disclosure includes a parking server 10 configured to manage a parking situation in the parking lot and an autonomous vehicle 20 equipped with an apparatus for controlling autonomous navigation according to the present disclosure.

First, the parking server 10 transmits and receives data to and from the autonomous vehicle 20 through a network or directly transmits and receives data to and from the autonomous vehicle 20 through a short range wireless communication.

Further, when the autonomous vehicle 20 enters the parking lot, the parking server 10 detects the entering of the autonomous vehicle 20 and provides parking lot information to the autonomous vehicle 20 entering in the parking lot. The parking lot information includes parking lot map data, parking available slots (empty parking slots), and a path to the parking available slot.

The parking lot map data indicate that a plurality of virtual lanes are located in a driving road in the parking lot and grid points are located in each virtual lane by a certain interval. In this case, the grid point includes a weight, location information, virtual lane information, direction information, and attribute information (parking, out from a parking lot, going straight, corner, corner proximity, and the like).

Next, the autonomous vehicle 20 performs autonomous parking in the parking lot based on parking lot information received from the parking server 10.

In particular, when an unexpected incident occurs, the autonomous vehicle 20 may efficiently process the unexpected incident by directly adjusting a weight of a grid point in each virtual lane and change a virtual lane on which the vehicle drives, in accordance with a location of the unexpected incident.

For example, when the virtual lanes include three lanes (a first lane, a second lane, and a third lane) and a pedestrian is detected around the third lane in a state in which the autonomous vehicle 20 is driven along the second lane, the autonomous vehicle 20 controls to change a lane of the autonomous vehicle 20 to the first lane by reducing a weight of the grid point in the third lane around the pedestrian, and increasing the weight of the grid point in the first lane around the pedestrian. In this case, the control is performed by the apparatus for controlling autonomous navigation.

Hereinafter, a virtual lane in a driving road in the parking lot is described with reference to FIG. 2.

Figure 2:
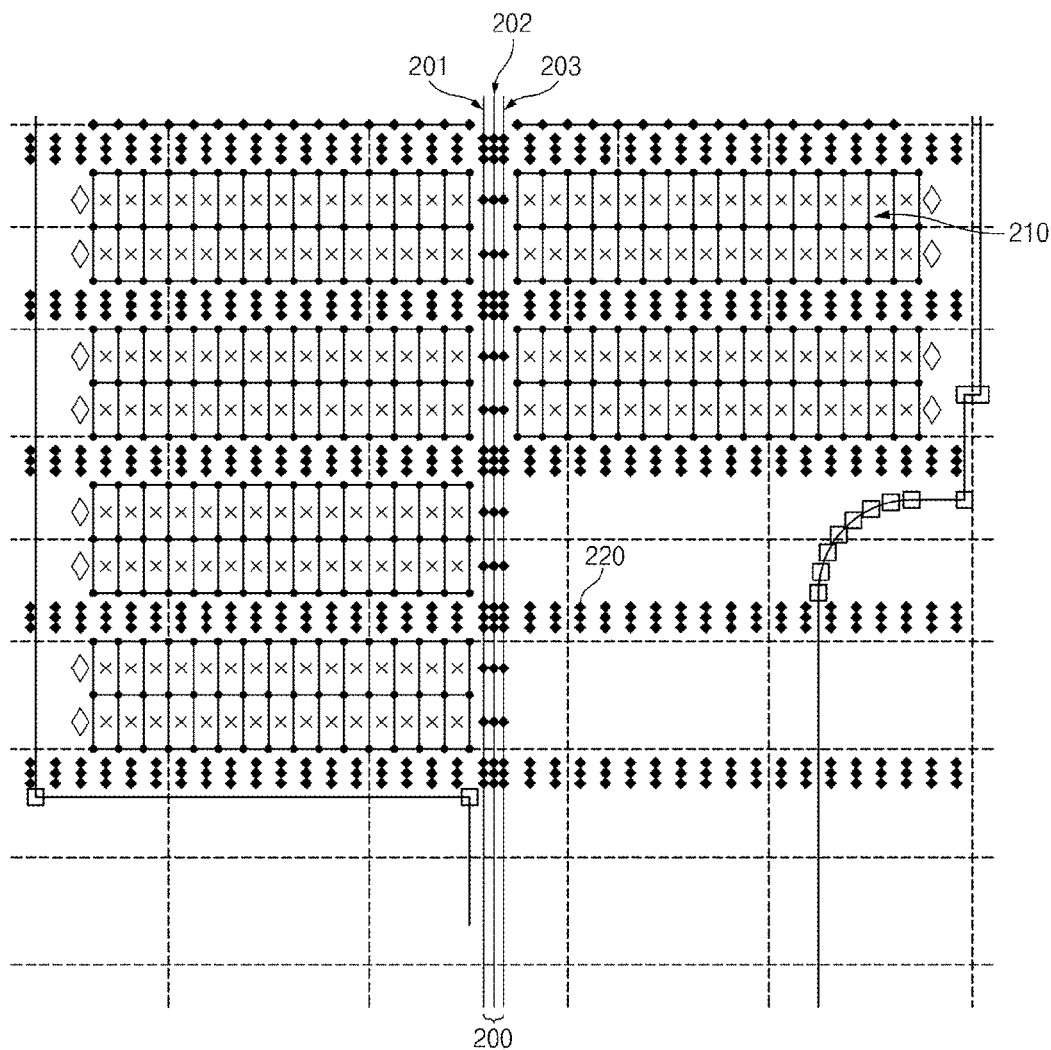
FIG. 2 is a diagram illustrating an example of a virtual lane in a driving road in the parking lot according to an embodiment of the present disclosure.

FIG. 2 is a diagram illustrating an example of a virtual lane in a driving road in the parking lot according to an embodiment of the present disclosure.

Figure 3:
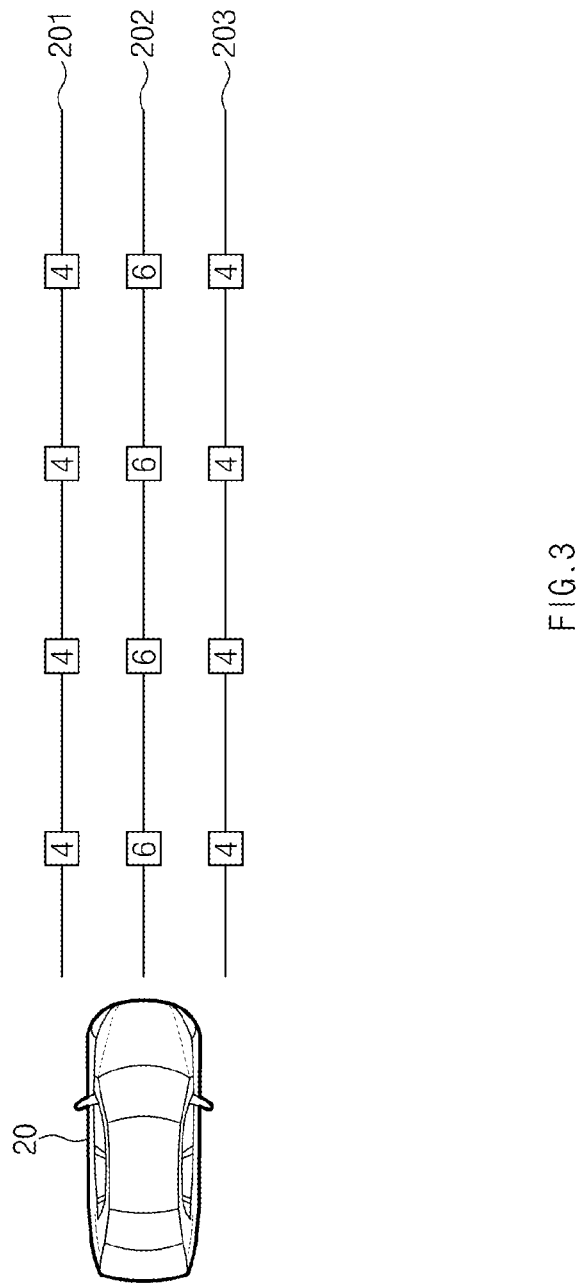
FIG. 3 is a diagram illustrating an example of a grid point in the virtual lane according to an embodiment of the present disclosure.

FIG. 2 illustrates three virtual lanes 200. The virtual lane in a driving road in the parking lot represents a virtual reference lane when an autonomous vehicle 20 is driven. The autonomous vehicle 20 tracks the virtual reference lane in the driving road. That is, as shown in FIG. 3, the autonomous vehicle 20 tracks the virtual reference lane while controlling steering in such a manner that the virtual reference lane is located at a center of the autonomous vehicle 20. In this case, reference numeral '210' represents a parking slot.

The parking server 10 communicates with the autonomous vehicle 20 entering the parking slot to obtain information (e.g., vehicle type, the whole width, the whole length, and the like) on the autonomous vehicle 20, and generate a virtual lane optimized to the autonomous vehicle 20 based on the obtained vehicle information. FIG. 2 illustrates a case of generating a first lane 201, a second lane 202, and a third lane 203 as three virtual lanes. In this case, the generation of the three virtual lanes does not always mean that three vehicles can drive simultaneously in each virtual line.

The parking server 10 generates a virtual lane as follows.

(1) The parking server 10 generates a center line in a driving road in the parking lot. The center line becomes the second lane 202.

(2) The parking server 10 generates the first lane 201 and the third lane 203 spaced apart from the center line by a certain distance at both sides of the center line in consideration of the right turn or the left turn of the autonomous vehicle 20, respectively. In this case, the spacing distance from the center line is determined by considering a turning radius of the autonomous vehicle 20.

For example, the turning radius of the autonomous vehicle 20 may be expressed by a following equation 1 based on Instantaneous Center of Rotation (ICR).

$$R = \frac{L}{\tan\phi} \qquad \text{[Equation 1]}$$

R represents the turning radius of the vehicle, L represents a distance from a front wheel of the vehicle to a rear wheel, and φ represents a steering angle.

In addition, when generating the first lane 201 and the third lane 203, the parking server 10 secures a room so that the autonomous vehicle 20 does not make contact with a vehicle which is normally parked.

(3) The parking server 10 configures a driving lane for accurately searching the parking slot to be perpendicular to the parking slot.

Meanwhile, the grid points 220 are located by a certain interval in each virtual lane which is generated as described above.

The grid points 20 store a weight used to control the driving of the autonomous vehicle 20, which is described in detail with reference to FIG. 3.

FIG. 3 is a diagram illustrating an example of a grid point in the virtual lane according to an embodiment of the present disclosure.

As shown in FIG. 3, three virtual lanes include a first lane 201, a second lane 202, and a third lane 203, and each lane includes a plurality of grid points.

For example, four grid points are located in the first lane 201, and each of the four grid points includes a weight 4.

Four grid points are located in the second lane 202, and each of the four grid points includes a weight 6.

Four grid points are located in the third lane 203, and each of the four grid points includes a weight 4.

In general, the weight of the grid points in the second lane 202 is set higher than the weight of the grid points in the first lane 201 and the weight of the grid points in the third lane 203 so that the autonomous vehicle 20 may be driven on a center of the driving road.

Figure 4:
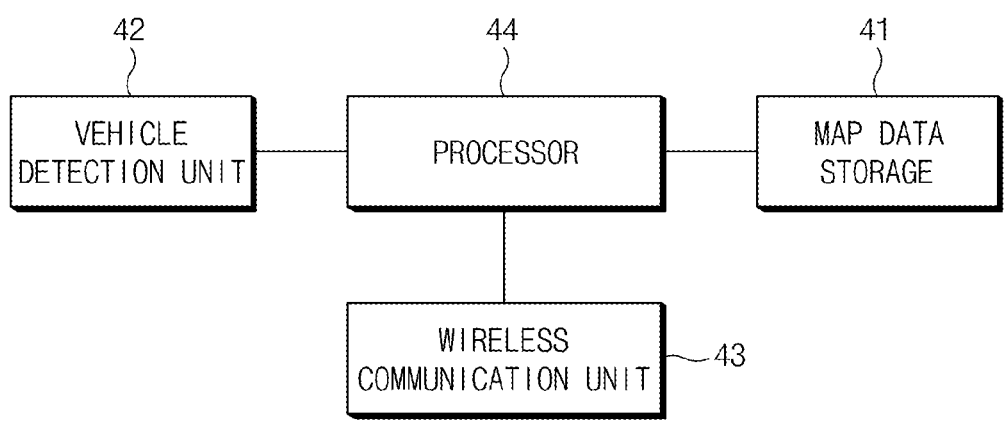
FIG. 4 is a block diagram illustrating a configuration of a parking server according to an embodiment of the present disclosure.

FIG. 4 is a block diagram illustrating a configuration of a parking server 10 according to an embodiment of the present disclosure.

As shown in FIG. 4, the parking server 10 according to the present disclosure includes a map data storage 41, a vehicle detection unit 42, a wireless communication unit 43, and a processor 44.

The map data storage 41 stores parking lot map data which indicates that a plurality of virtual lanes are located in a driving road in the parking lot and grid points are located in each virtual lane by a certain interval. In this case, each grid point includes a weight.

The vehicle detection unit 42 is installed at an entrance of the parking lot and detects the vehicle entering the parking lot. The vehicle detection unit 42 includes at least one of a radar, a laser sensor, an ultrasonic sensor, and an image sensor.

The wireless communication unit 43 provides a communication interface with the autonomous vehicle 20 and, particularly, transmits parking lot information to the autonomous vehicle 20. In this case, the parking lot information includes parking lot map data and a parking path of the autonomous vehicle 20.

Further, the wireless communication unit 43 may use one of wireless internet, short range wireless communication, and mobile communication to communicate with the autonomous vehicle 20.

When the vehicle detection unit 42 detects the autonomous vehicle 20 entering the parking lot, the processing 44 transmits the parking lot map data stored in the map data storage 41 to the autonomous vehicle 20 through the wireless communication unit 43. The parking lot map data include a parking path, and the parking path is set by a weight of the grid point in the virtual lane.

Figure 5:
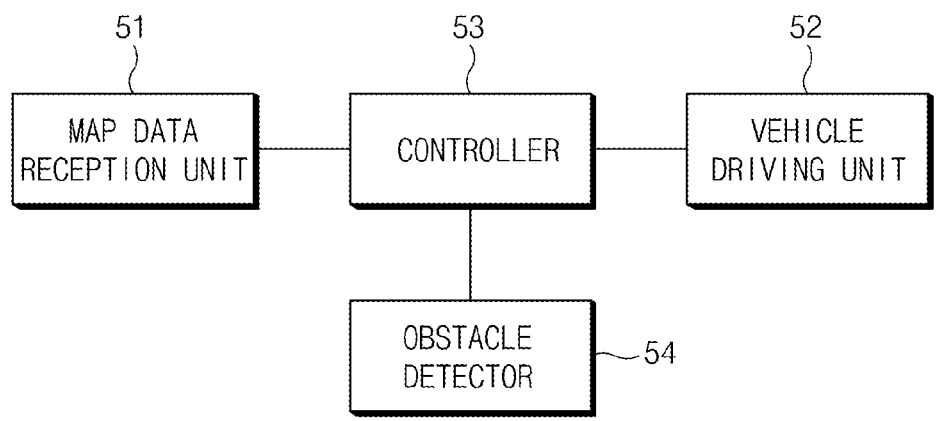
FIG. 5 is a block diagram illustrating an apparatus for controlling autonomous navigation according to an embodiment of the present disclosure.

FIG. 5 is a block diagram illustrating an apparatus for controlling autonomous navigation according to an embodiment of the present disclosure.

As shown in FIG. 5, the apparatus for controlling autonomous navigation according to the present disclosure is mounted in the autonomous vehicle 20, and includes a map data reception unit 51, a vehicle driving unit 52, a controller 53, and an obstacle detector 54.

Referring to the above mentioned elements, when the vehicle enters the parking lot, the map data reception unit 51 receives the parking lot map data indicating that a plurality of virtual lanes are located in a driving road in the parking lot and grid points are located in each virtual lane by a certain interval from the parking server 10. In this case, each grid point includes a weight. The weight is used to guide the autonomous vehicle 20 from the entrance of the parking lot to a parking slot, to guide the autonomous vehicle 20 from the parking slot to the entrance of the parking lot, or to avoid various obstacles.

Next, the vehicle driving unit 52 drives the vehicle by performing acceleration, braking, speed change, and steering of the vehicle.

Next, the controller 53 controls the driving of the autonomous vehicle 20 based on the weight of each grid point included in the parking lot map data received by the map data reception unit 51. That is, the controller 53 controls the vehicle driving unit 52 in such a manner that the autonomous vehicle 20 passes a grid point having a high weight.

Hereinafter, a procedure of controlling the autonomous vehicle 20 based on the weight of the each grid point is described with reference to FIG. 6 and FIG. 7.

Figure 6:
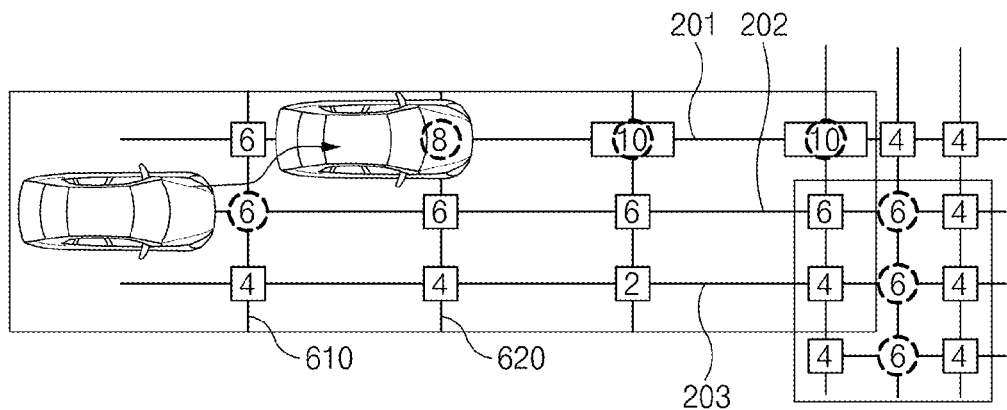
FIG. 6 is a diagram illustrating a cornering procedure of an autonomous vehicle according to an embodiment of the present disclosure.

FIG. 6 is a diagram illustrating a cornering procedure of an autonomous vehicle according to an embodiment of the present disclosure.

As shown in FIG. 6, when the autonomous vehicle 20 driving in the second lane 202 in a driving road in the parking lot should turn right, the autonomous vehicle 20 is driven in the second lane 202 having the highest weight among grid points of each virtual lane by a first time 610.

Next, since the grid point of the first lane 201 has the greatest weight at a second time 620, the autonomous vehicle 20 moves to the first lane 201 from the second lane 202.

After that, since the grid point of a center lane has the greatest weight after the right turn, the autonomous vehicle 20 is driven based on the center lane.

Figure 7:
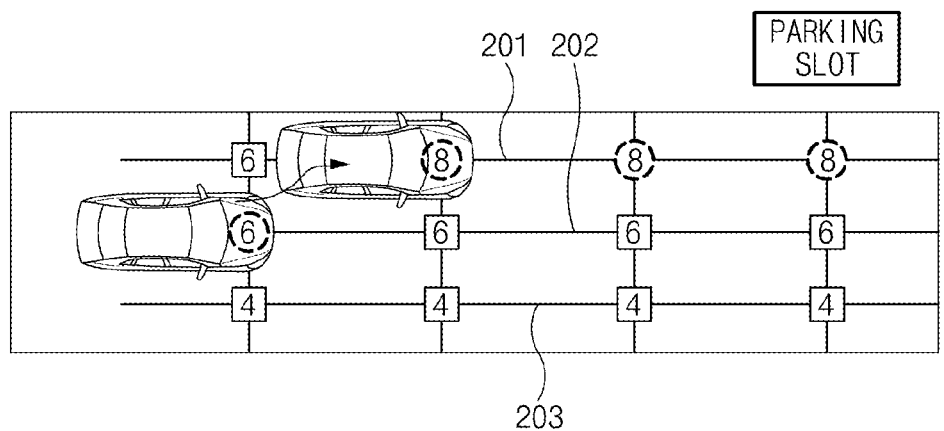
FIG. 7 is a diagram illustrating a parking slot searching procedure of the autonomous vehicle according to an embodiment of the present disclosure.

FIG. 7 is a diagram illustrating a parking slot searching procedure of the autonomous vehicle according to an embodiment of the present disclosure.

As shown in FIG. 7, since a target parking slot is located in the first lane 201 side, it may be recognized that a weight of the grid point in the first lane 201 around the target parking slot is set greatest.

Accordingly, if the autonomous vehicle 20 approaches the target parking slot, the autonomous vehicle 20 moves to the first lane 201 having the greatest weight of the grid point.

Next, the autonomous vehicle 20 performs a parking slot searching procedure in the first lane 201.

Figure 8:
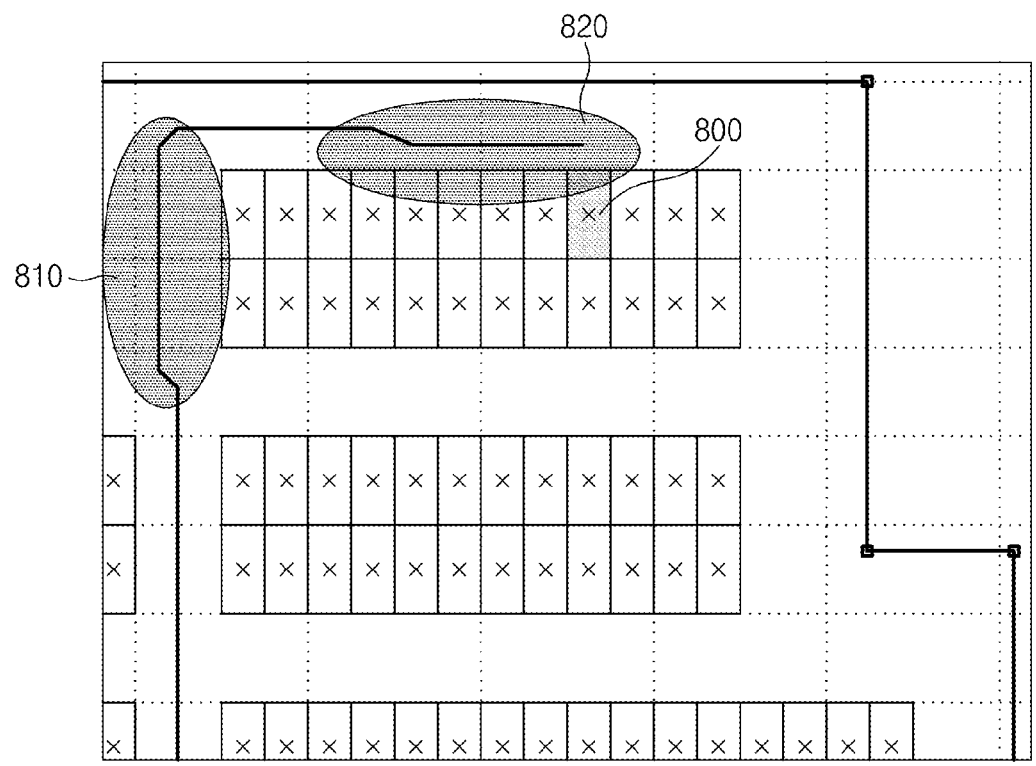
FIG. 8 is a diagram illustrating a driving path when the autonomous vehicle turns right and a driving path when the autonomous vehicle approaches a target parking slot.

Finally, a driving path 810 when the autonomous vehicle 20 turns right and a driving path 820 when the autonomous vehicle 20 approaches the target parking slot 800 are shown in FIG. 8. That is, if the autonomous vehicle 20 running in the second lane 202 (shown in FIG. 7) approaches a right turn point, the autonomous vehicle 20 moves to the first lane 201 (shown in FIG. 7), turns right, and is driven again in a center lane after the right turn (810). If the autonomous vehicle 20 approaches the target parking slot 800, the autonomous vehicle 20 moves to a lane in a direction of the target parking slot 800 and searches the parking slot (820).

Referring back to FIG. 5, the obstacle detector 54 that is an additional element of the present disclosure is a sensor module, and detects various obstacles in the driving road in the parking lot. In this case, the controller 530 avoids the obstacle by changing a weight of each grid point in the virtual lane according to a location of the obstacle detected by the obstacle detector 54.

Hereinafter, a procedure of avoiding collision by changing the weight by the controller 53 when the pedestrian is detected and when a reverse driving vehicle is detected is described with reference to FIG. 9 and FIG. 10.

Figure 9:
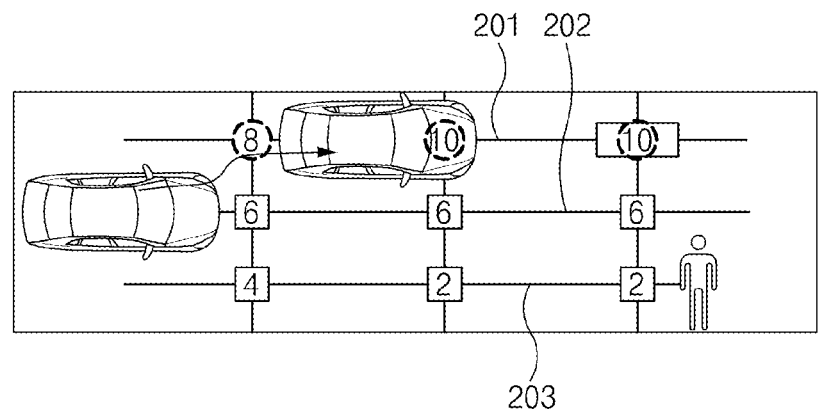
FIG. 9 is a diagram illustrating a procedure of avoiding a pedestrian by the autonomous vehicle according to an embodiment of the present disclosure.

FIG. 9 is a diagram illustrating a procedure of avoiding a pedestrian by the autonomous vehicle according to an embodiment of the present disclosure.

As shown in FIG. 9, upon detecting that a pedestrian is located around the third lane, the controller 53 reduces a weight of the grid point in the third lane 203 around the pedestrian. In addition, the controller 53 guides the autonomous vehicle 20 to the first lane 201 by increasing a weight of the grid point in the first lane 201 around the pedestrian.

Figure 10:
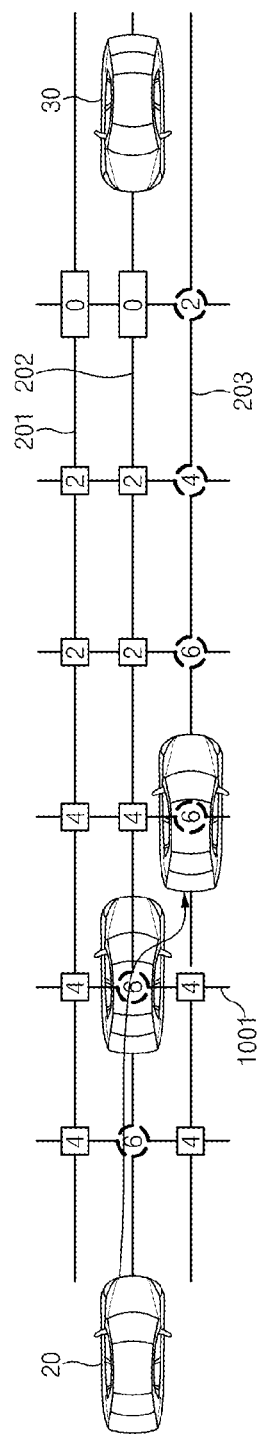
FIG. 10 is a diagram illustrating a procedure of avoiding a reverse driving vehicle by the autonomous vehicle according to an embodiment of the present disclosure.

FIG. 10 is a diagram illustrating a procedure of avoiding a reverse driving vehicle by the autonomous vehicle according to an embodiment of the present disclosure.

As shown in FIG. 10, the autonomous vehicle 20 is driven in the second lane 202 and the reverse driving vehicle 30 is driven in a direction of the autonomous vehicle 20 in the second lane 202.

At a time point 1001 of detecting the above situation, the controller 53 guides the autonomous vehicle 20 to run in the third lane 203 by increasing a weight of the grid point in the third lane 203.

Next, if a distance between the autonomous vehicle 20 and the reverse driving vehicle 30 is gradually reduced, the controller 53 reduces the weight of the grid point in each virtual lane with a certain rate. In this case, since a reversal of the weight of the grid point between respective virtual lanes does not occur, the lane change of the autonomous vehicle 20 does not occur.

Next, the controller 53 determines whether the autonomous vehicle 20 would make contact with the reverse driving vehicle 30 immediately before the autonomous vehicle 20 crosses the reverse driving vehicle 30. If it is determined that the autonomous vehicle 20 would not make contact with the reverse driving vehicle 30, the controller 53 continuously drives the autonomous vehicle 20. If it is determined that the autonomous vehicle 20 would make contact with the reverse driving vehicle 30, the controller 53 stops the autonomous vehicle 20.

Figure 11:
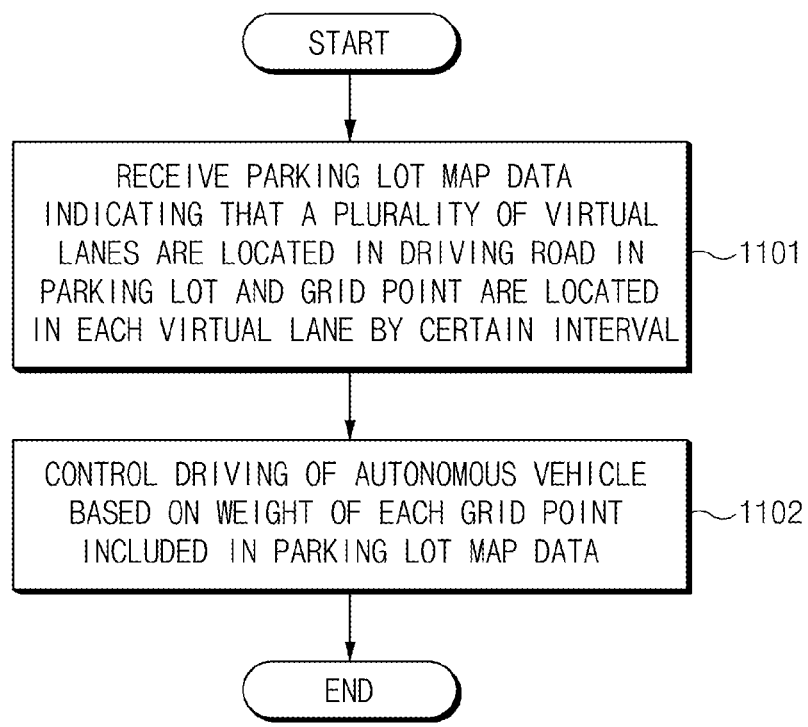
FIG. 11 is a flowchart illustrating a method for controlling autonomous navigation in a parking lot according to an embodiment of the present disclosure.

FIG. 11 is a flowchart illustrating a method for controlling autonomous navigation in a parking lot according to an embodiment of the present disclosure.

First, the map data reception unit 51 receives the parking lot map data indicating that a plurality of virtual lanes are located in a driving road in the parking lot and grid points are located in each virtual lane by a certain interval from the parking server 10 (1101).

Next, the controller 53 controls the driving of the autonomous vehicle 20 based on the weight of each grid point included in the parking lot map data (1102). That is, the controller 53 controls the vehicle driving unit 52 in such a manner that the autonomous vehicle 20 is driven in the virtual lane including the grid point having the greatest weight.

As described above, the present disclosure can efficiently move an autonomous vehicle to a desired location by controlling the driving of an autonomous vehicle in a parking lot, on the basis of parking lot map data indicating that a plurality of virtual lanes are located in a driving road in the parking lot and grid points are located in each virtual lane by a certain interval.

The foregoing method of the present disclosure may be implemented in a program command form executable by various computer means and be recorded in a computer readable recording medium. In this case, the computer readable recording medium may include a program command, a data file, and a data structure individually or a combination thereof. Further, the program command includes a machine language code created by a compiler and a high-level language code executable by a computer using an interpreter. The foregoing hardware device may be configured to be operated according to at least one software module to perform an operation of the present invention, or software modules may be configured to be operated according to the hardware device.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for controlling autonomous navigation, the apparatus comprising:
   a receiver configured to receive parking lot map data from a parking server, wherein the parking lot map data indicates that a plurality of virtual lanes are located in a driving road in a parking lot and grid points are located in each virtual lane by an interval; and
   a controller configured to control driving of an autonomous vehicle based on a weight of each grid point included in the parking lot map data,
   wherein the controller reduces a weight of a grid point in a first lane around an obstacle and increases a weight of a grid point in a lane furthest from the first lane, when the obstacle is detected in a first lane side.

2. The apparatus of claim 1, wherein the controller controls the autonomous vehicle to drive in a virtual lane including a grid point having a highest weight.

3. The apparatus of claim 1, wherein a weight of a grid point in a first lane around a right turn point is greater than a weight of a grid point in another lane.

4. The apparatus of claim 1, wherein, when a target parking slot is located in a first lane side, a weight of a grid point in a first lane around the target parking slot is greater than a weight of a grid point in another lane.

5. The apparatus of claim 1, wherein the parking server transmits the parking lot map data when the autonomous vehicle enters the parking lot.

6. The apparatus of claim 5, wherein the parking server sets a weight of a grid point in each virtual lane corresponding to a parking path.

7. The apparatus of claim 1, wherein the controller selectively adjusts weights of a group of grid points upon detecting an event occurring at one or more grid points among the group of grid points.

8. A method for controlling autonomous navigation, the method comprising:
   receiving parking lot map data from a parking server, wherein the parking lot map data indicates that a plurality of virtual lanes are located in a driving road in a parking lot and grid points are located in each virtual lane by an interval, by a receiver; and
   controlling driving of an autonomous vehicle based on a weight of each grid point included in the parking lot map data, by a controller,
   wherein controlling driving of an autonomous vehicle comprises reducing a weight of a grid point in a first lane around an obstacle, and increasing a weight of a grid point in a lane furthest from the first lane, when the obstacle is detected in a first lane side.

9. The method of claim 8, wherein controlling driving of an autonomous vehicle comprises controlling the autonomous vehicle to drive in a virtual lane including a grid point having a highest weight.

10. The method of claim 8, wherein a weight of a grid point in a first lane around a right turn point is greater than a weight of a grid point in another lane.

11. The method of claim 8, wherein, when a target parking slot is located in a first lane side, the weight of the grid point in a first lane around the target parking slot is greater than a weight of a grid point in another lane.

12. The method of claim 8, further comprising selectively adjusting, by the controller, weights of a group of grid points upon detecting an event occurring at one or more grid points among the group of grid points.

* * * * *